United States Patent [19]

Gee et al.

[11] Patent Number: 5,725,233
[45] Date of Patent: Mar. 10, 1998

[54] PORTABLE TONGUE FOR TRAILERS

[75] Inventors: Calvin J. Gee, Somerville; John M. Matkin, Boaz, both of Ala.

[73] Assignee: GMT, Inc., Boaz, Ala.

[21] Appl. No.: 555,298

[22] Filed: Nov. 8, 1995

Related U.S. Application Data

[63] Continuation-in-part of Ser. No. 5,789, Jan. 19, 1993, Pat. No. 5,348,333, and a continuation-in-part of Ser. No. 209,241, Mar. 14, 1994, Pat. No. 5,465,993.

[51] Int. Cl.$^6$ .............................. B60D 1/167; B60D 1/52
[52] U.S. Cl. ........................... 280/491.5; 280/406.2; 280/475; 280/495
[58] Field of Search ..................... 280/491.5, 491.1, 280/491.2, 491.3, 495, 490.1, 496, 406.2, 406.1, 405.1, 461.1

[56] References Cited

U.S. PATENT DOCUMENTS

| 2,150,066 | 3/1939 | Kalb | 280/495 |
|---|---|---|---|
| 2,628,126 | 2/1953 | Black | 280/491.1 |
| 3,384,391 | 5/1968 | Batke | 280/491.3 |
| 3,765,704 | 10/1973 | Tierno | 280/491.5 |
| 4,204,702 | 5/1980 | Oltrogge | 280/491.5 |
| 4,614,354 | 9/1986 | Stagne | 280/491.5 |
| 4,869,521 | 9/1989 | Johnson | 280/491.1 |
| 5,348,333 | 9/1994 | Gee | 280/491.5 |
| 5,465,993 | 11/1995 | Gee et al. | 280/491.5 |
| 5,507,515 | 4/1996 | Schellenberg et al. | 280/491.5 |

*Primary Examiner*—Anne Marie Boehler
*Attorney, Agent, or Firm*—John C. Garvin, Jr.

[57] ABSTRACT

A portable (removable) tongue for connecting a house trailer to a towing vehicle for towing the trailer from one location to another with the tongue being adapted for easy and rapid disconnection from the towing vehicle and trailer. The tongue is adapted to be attached to, and removed from, the frame which supports a house trailer and includes a coupler and hitch lock, a pair of arms connected to and diverging from the coupler and hitch lock, a first pair of coupling members associated with the free ends of each arm, and a second pair of coupling members adapted to be secured to the frame of the trailer, and a fastener for locking each first coupling member to a respective second coupling member. The tongue is adapted to be readily secured to the frame of the trailer for towing purposes and easily removed from the frame of the trailer while the trailer is parked in a trailer court for living purposes.

14 Claims, 3 Drawing Sheets

PORTABLE TONGUE FOR TRAILERS

This application is a continuation-in-part of application, Ser. No. 08/005,789, filed Jan. 19, 1993, now U.S. Pat. No. 5,348,333 and application, Ser. No. 08/209,241, filed Mar. 14, 1994 now U.S. Pat. No. 5,465,993.

FIELD OF THE INVENTION

This invention relates to removable means for vehicular towing, and more particularly to a portable tongue for connecting a house trailer to a towing vehicle for towing the house trailer from one location to another with the tongue being adapted for easy and rapid disconnection from the towing vehicle and the house trailer.

BACKGROUND OF THE INVENTION

Conventional house trailers have, for many years, included a generally triangular-shaped tongue permanently secured to one of the narrow sides (front) of the trailer and protruding three to four feet from the trailer, while the trailer is being towed, while the trailer is temporarily located on a sales lot, and when the trailer is in a trailer park and being used as a home. The conventional tongue, being permanently secured to the trailer, not only takes up substantial space, but also presents a safety hazard which can be easily tripped over by a person walking through the area or by children playing in the area.

While there are numerous hitch assemblies in the prior art, those disclosed and claimed in U.S. Pat. Nos. 3,716,255 and 3,759,547 are the most relevant to the subject matter of the invention disclosed herein.

The portable tongue shown in U.S. Pat. No. 3,716,255 is adapted to be removably secured to an elongated channel beam fixed to a trailer with the channel beam having a centrally located opening therein and a web projecting from its lower edge. The tongue includes a pair of diverging arms fixed to an elongated, generally flat, hitching beam having a centrally located opening therein adapted for alinement with the opening in the channel beam of the trailer and a hook on its lower edge adapted for wrapping partially around and engaging the web projecting from the channel beam of the trailer. A bolt is inserted through the aligned openings in the channel beam of the trailer and the hitching beam of the tongue for securing the tongue to the trailer by applying a nut upon the bolt.

The portable tongue shown in U.S. Pat. No. 3,759,547 is adapted to be removably secured to a complex beam structure fixed to the load bearing understructure of a trailer. The complex beam structure includes a pair of connection plates with each plate having a plurality of openings therein. The tongue includes a pair of diverging arms, each having a connection plate with a plurality of openings therein and adapted for alinement with the openings in a respective connection plate fixed to the complex beam structure of the load bearing understructure of the trailer. The tongue is secured to the trailer by aligning the openings in the two pairs of connection plates, inserting a bolt vertically through the aligned openings and applying a nut to each bolt.

The prior art portable tongues for trailers, including those discussed above, have not been readily accepted by industry and presented problems and disadvantages particularly when compared to the simple, inexpensive, portable tongue of the present invention. The conventional tongues which are permanently fixed to the trailer, not only add costs to the trailer and take up substantial space while the trailer is temporarily parked in either a sales lot or more permanently parked in a trailer park, they also present a major safety hazard to people walking or playing around the trailer when so parked. There is, therefore, a need for a rugged, durable, and inexpensive removable (portable) tongue for trailers which overcome the problems and disadvantages of the prior art and conventional tongues for trailers. The portable (removable) tongue of the present invention fulfills these needs.

Accordingly, it is an object of the present invention to provide a simple, inexpensive, and portable tongue for connecting a house trailer to a towing vehicle for towing the house trailer from one location to another with the tongue being adapted for easy disconnection from both the towing vehicle and house trailer.

A further object of the present invention is to provide a portable tongue for use with the frame of a trailer which can be readily and easily detached from the frame of the trailer by the removal of a limited number of securing members without the need for special tools or mechanical skills.

These objects as well as other objects and advantages of the present invention will become more readily apparent from the following description taken in conjunction with the accompanying drawings.

DETAILED DESCRIPTION OF THE INVENTION

Figure 1:
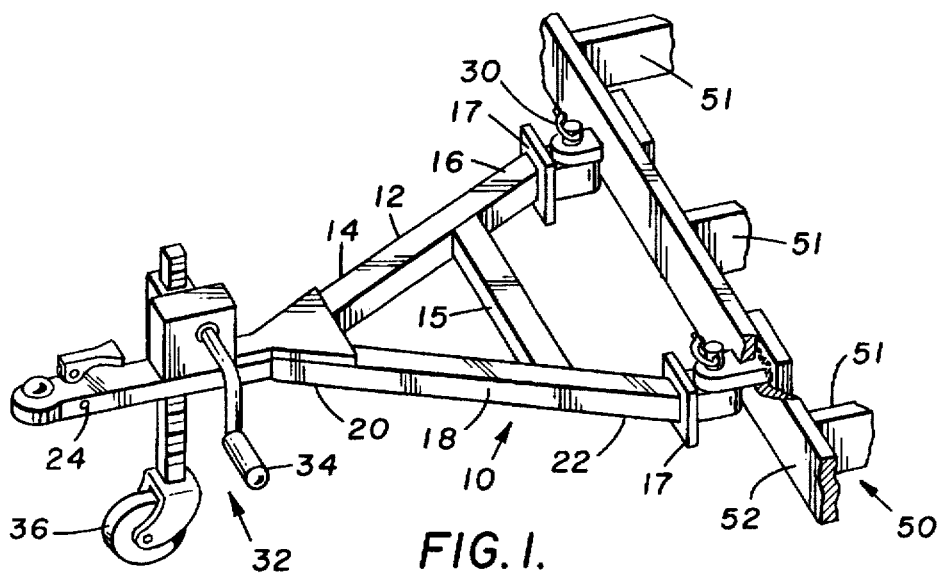
FIG. 1 is a partially broken away, perspective, view of the preferred embodiment of the portable tongue of the present invention removably secured to a frame, such as may be used for a house trailer.
Figure 2:
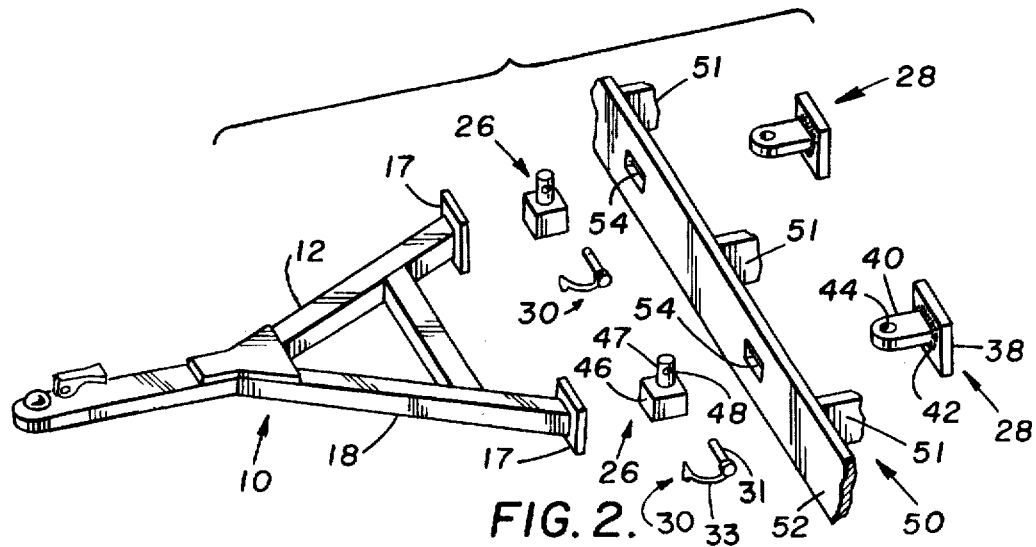
FIG. 2 is an exploded view of the portable tongue of FIG. 1 separated from a frame.

FIG. 1 illustrates, by way of example, a first embodiment of a portable (removable or detachable) tongue 10 removably secured to the most forward transverse cross member 52 of frame 50 which supports a house trailer or the like (not shown). Support frame 50 also includes a plurality of longitudinally extending support members 51 which are integrated or secured to cross members 52 by any conventional means such as welds (not shown). As shown, the most forward cross member 52 of frame 50 has a pair of openings 54 (FIG. 2) therethrough for receiving female coupling members 28 permanently secured to the most forward cross member 52 by any conventional means such as bolts or welds (not shown). As best illustrated, by way of example, in FIGS. 1 and 2, the portable (removable) tongue 10 comprises a first arm 12 having a first end portion 14 and a second end portion 16, a second arm 18 having a first end portion 20 and a second end portion 22, a rod 15 secured to and connecting first arm 12 and second arm 18 for bracing and strengthening tongue 10, a conventional trailer coupler and hitch lock 24 secured to the first end portion 14 of first arm 12 and first end portion 20 of second arm 18, a plate 17 fixed to second end portion 16 of first arm 12 by any conventional means such as welds (not shown), a plate 17 fixed to second end portion 22 of second arm 18 by any conventional means such as welds (not shown), a male coupling member 26 secured to each of the plates 17 fixed to second end portions 16 and 22 of first arm 12 and second arm 18 by any conventional means such as welds or nuts and bolts (not shown), a pair of female coupling members 28, a pair of locking clips 30, and a conventional crank jack 32 (FIG. 1) including a crank handle 34 and a wheel 36. Each of the female coupling members 28 has a generally rectangular base plate 38 adapted to be fixed to the back or inside surface of the most forward cross member 52 of frame 50 by any conventional means such as welds or bolts (not shown), a projection 40 extending from and secured to the base plate 38 by any conventional means such as welds 42 (FIG. 2), and a round opening 44. Each of the male coupling members 26 includes an enlarged base 46 fixed to the plates 17 on the second end portions 16 and 22 respectively of first arm 12 and second arm 18 by any suitable means such as welds or bolts (not shown), a round bar 47 extending from and secured to the top side of enlarged base 46 by being made integrally therewith or by any suitable means such as welds, and a transverse bore 48 in the upper end of round bar 47. The tongue 10 is removably secured to the most forward cross member 52 of frame 50 by inserting each of the round bars 47 of bases 46 affixed to the plates 17 on second end portions 16 and 22 respectively of first arm 12 and second arm 18 upwardly into round openings 44 of female coupling members 28 until the transverse bore 48 of each round bar 47 is fully exposed above the upper surface of each of the projections 40 of female coupling members 28 and a locking clip 30 is inserted through each transverse bore 48 and secured to lock each round bar 47 of male coupling members 26 to a respective female coupling member 28. Locking clip 30 may be any conventional clip or even a simple nut and bolt. As shown, each clip 30 comprises a round bar 31 having an arm 33 secured to one of its ends and adapted to be bent to engage the other end of bar 31 as best shown in FIG. 1, thus locking the clip to prevent accidental removal of the clip 30.

As is readily apparent, portable tongue 10 can be easily and readily separated from frame 50 of a trailer by removing each locking clip 30, thus allowing each round bar 47 of male coupling members 26 to be lowered and separated from the round openings 44 in projections 40 of female coupling members 28. This separation of tongue 10 from the frame 50 obviates the safety hazard discussed herein and allows a person to either store the tongue 10 or use tongue 10 over and over for attachment to trailers for towing purposes.

Figure 3:
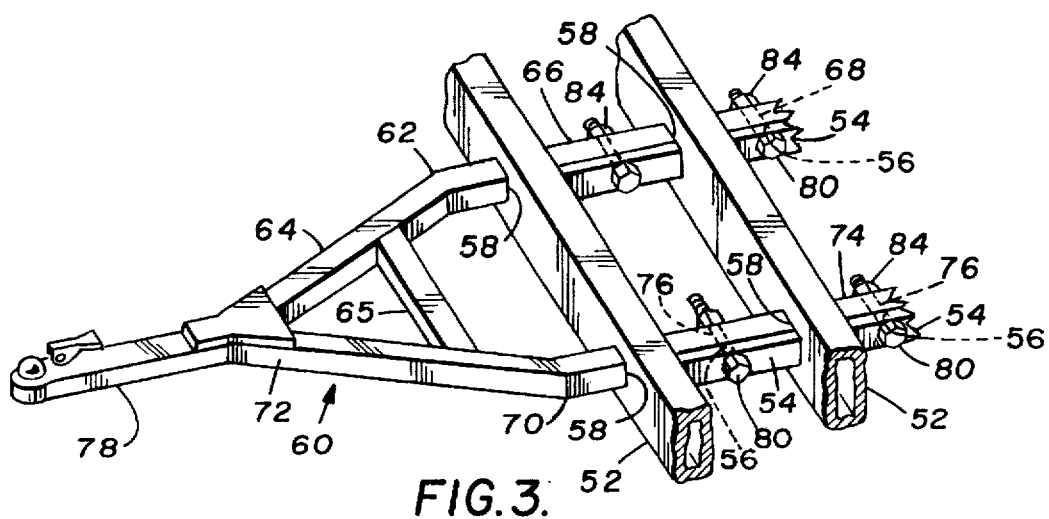
FIG. 3 is a partially broken away, exploded view of a second embodiment of the portable tongue of the present invention removably secured to a frame, such as may be used for a house trailer.

FIG. 3 illustrates, by way of example, a second embodiment of the portable (removable) tongue 60 removably secured to the two most forward cross members 52 and 53 of frame 50 which supports a house trailer or the like (not shown). As shown, frame 50 also includes beams 54 which are secured perpendicular to adjacent cross members 52 and 53 by any suitable means such as welds (not shown) with each beam 54 including an opening 56 for purposes to be explained later. Cross members 52 and 53 have the ends of beams 54 in abutting secured relation with cross member 53 being rearward of and in spaced relation with cross member 52. Further, as shown, each of the two most forward cross members 52 and 53 has a pair of openings 58 therethrough through which second sections 66 and 74 pass for purposes to be later explained. FIG. 3 illustrates, by way of example, the portable (removable) tongue 60 as comprising a first arm 62, a second arm 70, and a conventional coupler and hitch lock 78. For simplicity, the conventional jack 32, as shown in FIG. 1, is not shown in FIG. 3, however, it is to be understood that a conventional jack could be fixed by any suitable means such as welds to the first arm 62 and the second arm 70 at a location immediately behind the conventional coupler and hitch lock 78 in the general manner disclosed in the embodiment of FIG. 1. First arm 62 includes a first section 64 and a second section 66, with first section 64 being at an angle to its second section 66. Second arm 70 includes a first section 72 and a second section 74, with first section 72 being at an angle to its second section 74. Second section 66 of first arm 62 includes a pair of horizontal holes 68 therein. Second section 74 of second arm 70 includes a second pair of horizontal holes 76 therein. The first section 64 of first arm 62 and the first section 72 of second arm 70 diverge and meet at a point where their free forward ends are permanently secured by conventional means such as welds to conventional coupler and hitch lock 78. A rod 65 is secured to and connects first arm 62 and second arm 70 for bracing and strengthening tongue 60. When the parts of tongue 60 are assembled and permanently secured, the second section 66 of first arm 62 is parallel to the second section 74 of second arm 70. When it becomes necessary to move a house trailer secured to the frame 50 as depicted in FIG. 3, a user would merely insert the free ends of the second sections 66 and 74 of arms 62 and 70 through openings 58 in the two most forward cross members 52 and 53 of frame 50 to a position where the horizontal holes 68 of first arm 62 and the horizontal holes 76 of second arm 70 are behind the respective one of the most forward cross members 52 and 53 of frame 50 in alinement with the holes 56 in beams 54 and then insert a bolt 80 through each hole 56 and 76 and applying a lock washer (not shown) and nut 84 to each bolt 80.

As is readily apparent, portable tongue 60 can be easily and readily separated from the cross members 52 of the frame by removing each bolt 80, the lock washer and nut 84, thus allowing the free ends of the second sections 66 and 74 of arms 62 and 70 of tongue 60 to be removed from the openings 58 in cross members 52. The separation of tongue 60 from the cross members 52 of the frame obviates the safety hazard discussed herein and allows a person to either store the tongue 60 or use the tongue 60 over and over for towing purposes.

Figure 4:
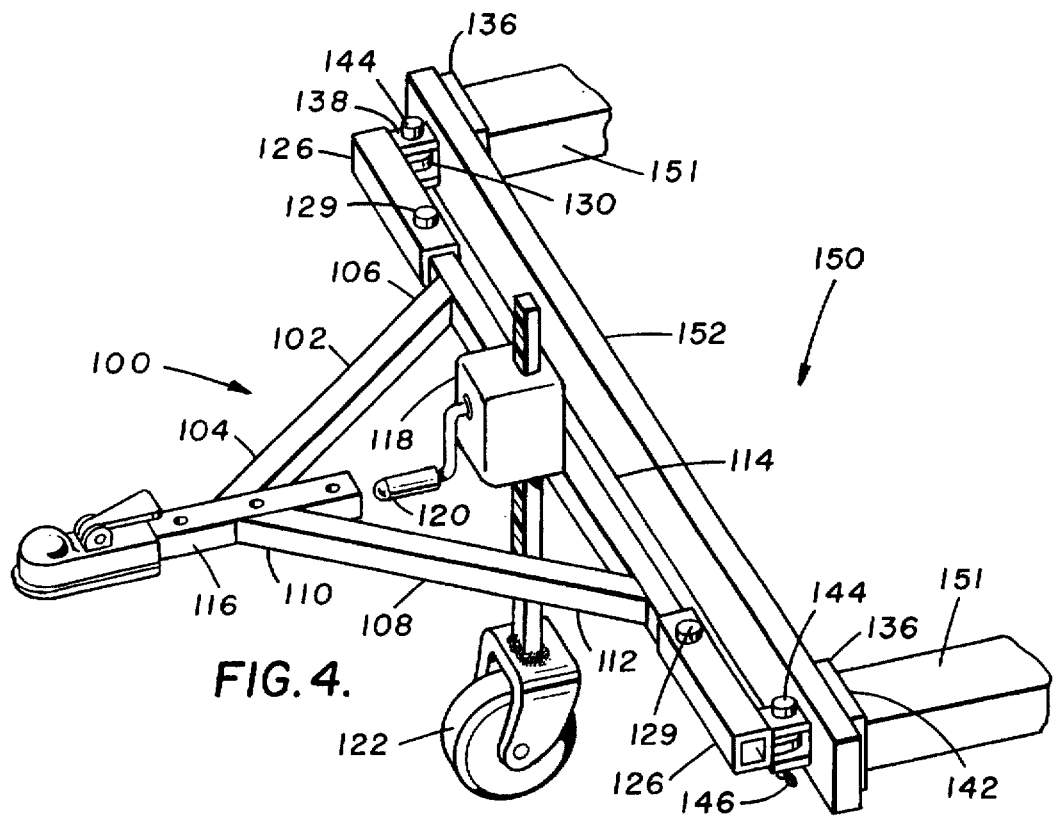
FIG. 4 is a partially broken away, perspective, view of a third embodiment of the portable tongue of the present invention removably secured to a frame, such as may be used for a house trailer.
Figure 5:
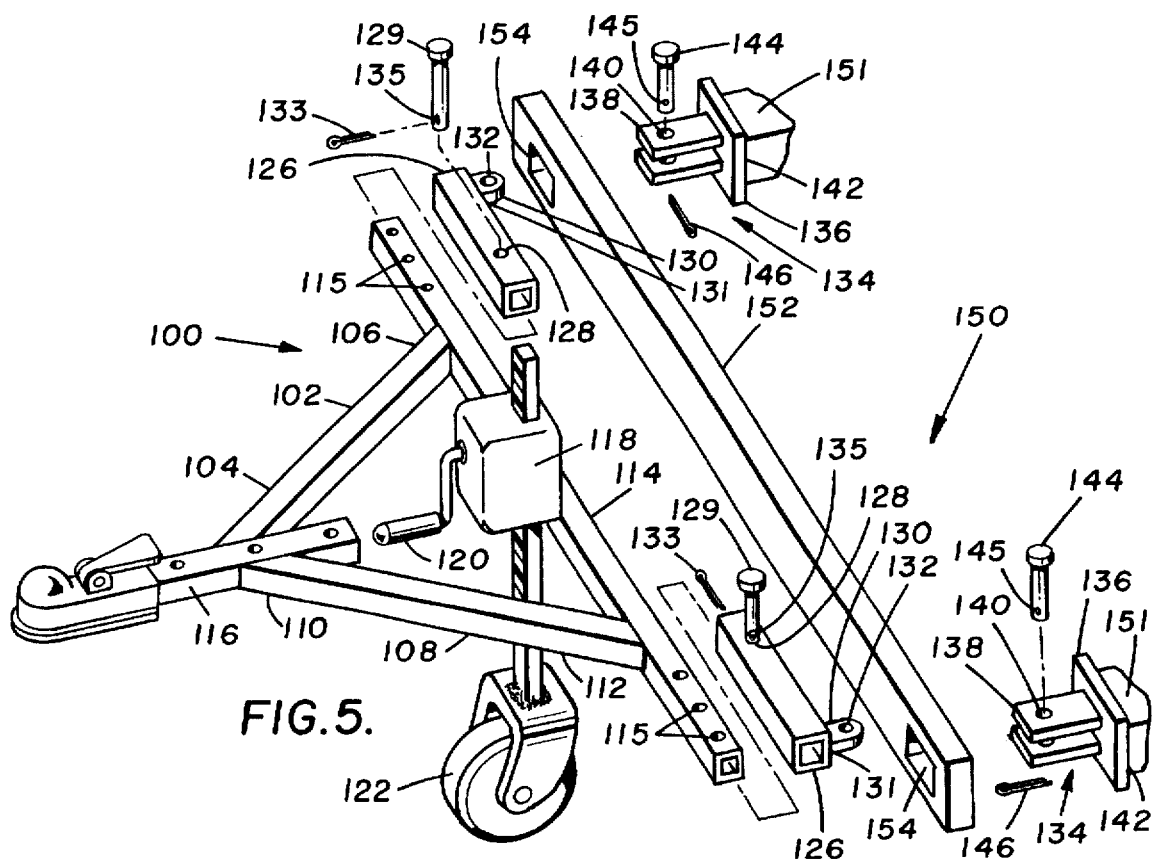
FIG. 5 is an exploded view of the portable tongue of FIG. 4 with a portion thereof attached to a frame, such as may be used for a house trailer.

FIGS. 4 and 5 illustrate, by way of example, a third embodiment of the portable (removable) tongue 100 removably secured to the most forward cross member 152 and a pair of longitudinal support members 151 of a frame which supports a house trailer or the like (not shown). The longitudinal support members 151 may be interconnected by welds or the like to one or more additional cross members (not shown). The portable (removable) tongue 100 comprises a first arm 102 having a first end portion 104 and a second end portion 106, a second arm 108 having a first end portion 110 and a second end portion 112, a cross bar 114 having a series of openings 115 in its ends and being secured to second end portions 106 and 112 of first and second arms 102 and 108 by any conventional means such as welds (not shown), a conventional trailer coupler and hitch lock 116 secured to first end portions 104 and 110 of first and second arms 102 and 108 by any conventional means such as welds (not shown), a conventional crank jack 118 including a crank handle 120 and wheel 122 secured to cross bar 114 by any conventional means such as welds (not shown), a pair of hollow coupling boots or first coupling members 126, each including at least one opening 128 therein and a projection 130 having an opening 132 therein, each projection 130 being secured to a respective boot member 126 by welds 131, each coupling boot member 126 being adapted for telescoping over the ends (unnumbered) of cross member 114 and being locked thereto in a selected position by locking pins 129 which pass through an opening 128 in boot member 126 and a selected opening 115 in the ends of cross bar 114. As shown in FIG. 5, cotter pins 133 may be used to pass through openings 135 in locking pins 129 to make certain that the locking pins 129 lock boot members 126 to cross bar 114. The portable (removable) tongue 100 further comprises a pair of second coupling members 134, each including a base plate 136 and a pair of protruding ears 138 having vertical openings 140 therein adapted for receiving pins 144 therethrough. Each pin 144 has an opening 145 therein for receiving a cooperating cotter pin 146. The base plate 136 of each of the second coupling members 134 are secured to the forward end of a respective longitudinal support member 151 by any suitable means such as a weld 142. The most forward cross member 152 has a pair of openings 154 adjacent its ends in general alinement with the longitudinal support members 151 of the frame of the type which supports a house trailer or the like. The portable tongue 100 depicted in the exploded view of FIG. 5 can be assembled and attached to the longitudinal support members 151 of the frame of a house trailer or the like (after the base plates 136 of the second coupling members 134 are welded to the forward ends of longitudinal support members 151) as shown in FIG. 4 by inserting the walls of the openings 154 of the most forward cross member 152 around the protruding ears 138 of second coupling member 134; telescoping the first coupling or boot members 126 over a respective end of cross bar 114 until a projection 130 of first coupling member 126 is in alinement with the protruding ears 138 of second coupling member 134 at which time respective locking pins 129 are inserted into respective, selective, openings 128 in first coupling member 126 and cotter pins 133 are inserted through openings 135 of pins 129 to lock first coupling members 126 in their desired positions on cross bar 114; after which the respective projections 130 of first coupling member 126 are inserted between the protruding ears 138 of second coupling member 134 until the openings 132 and 140 are in alinement at which time the locking pins 144 are inserted through respective openings 140 and 132 and a fastener or cotter pin 146 is applied through the opening 145 in the lower end of each locking pin 144.

As is readily apparent, all of the components of the portable tongue 100 except for the second coupling member 134 disclosed in the embodiment of FIGS. 4 and 5 can be easily separated from the frame of a trailer or the like by removing each fastener or cotter pin 146 from locking pins 144, lifting each locking pin 144 from the openings 132 and 140 respectively in first coupling member 126 and second coupling member 134, thus allowing first coupling member 126 to be move forward for separation from second coupling member 134. This separation obviates the safety hazard discussed herein and allows a person to either store most components of tongue 100 or use the tongue over and over for attachment to trailers having the second coupling members 134 secured thereto for towing purposes.

Figure 6:
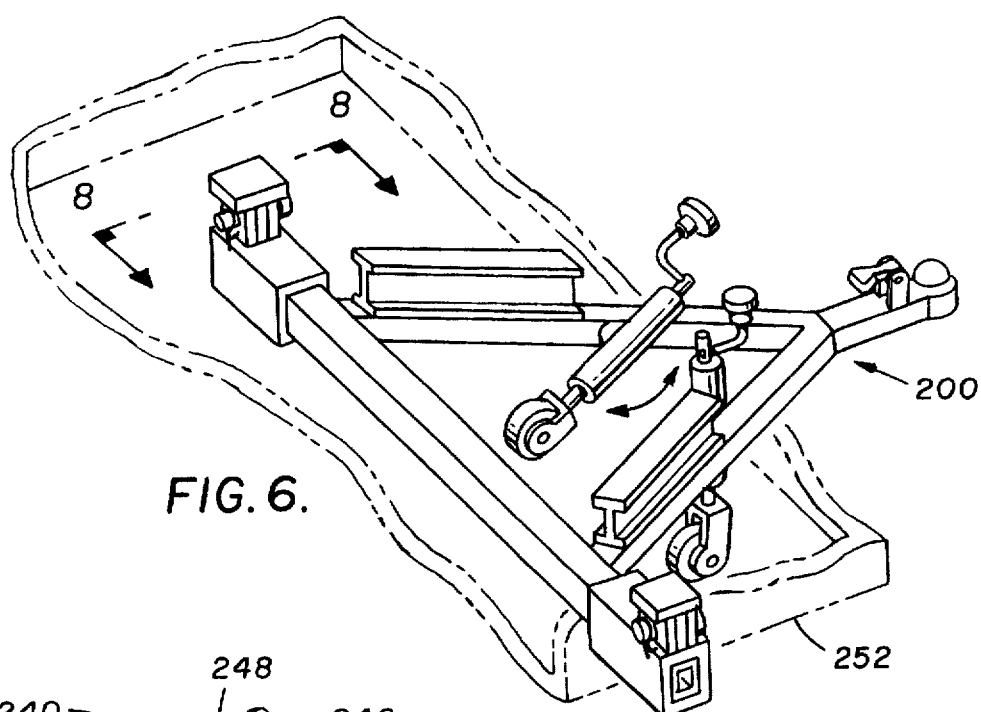
FIG. 6 is a perspective view of a fourth embodiment of the portable tongue of the present invention removably secured to a frame, such as may be used for a house trailer.
Figure 7:
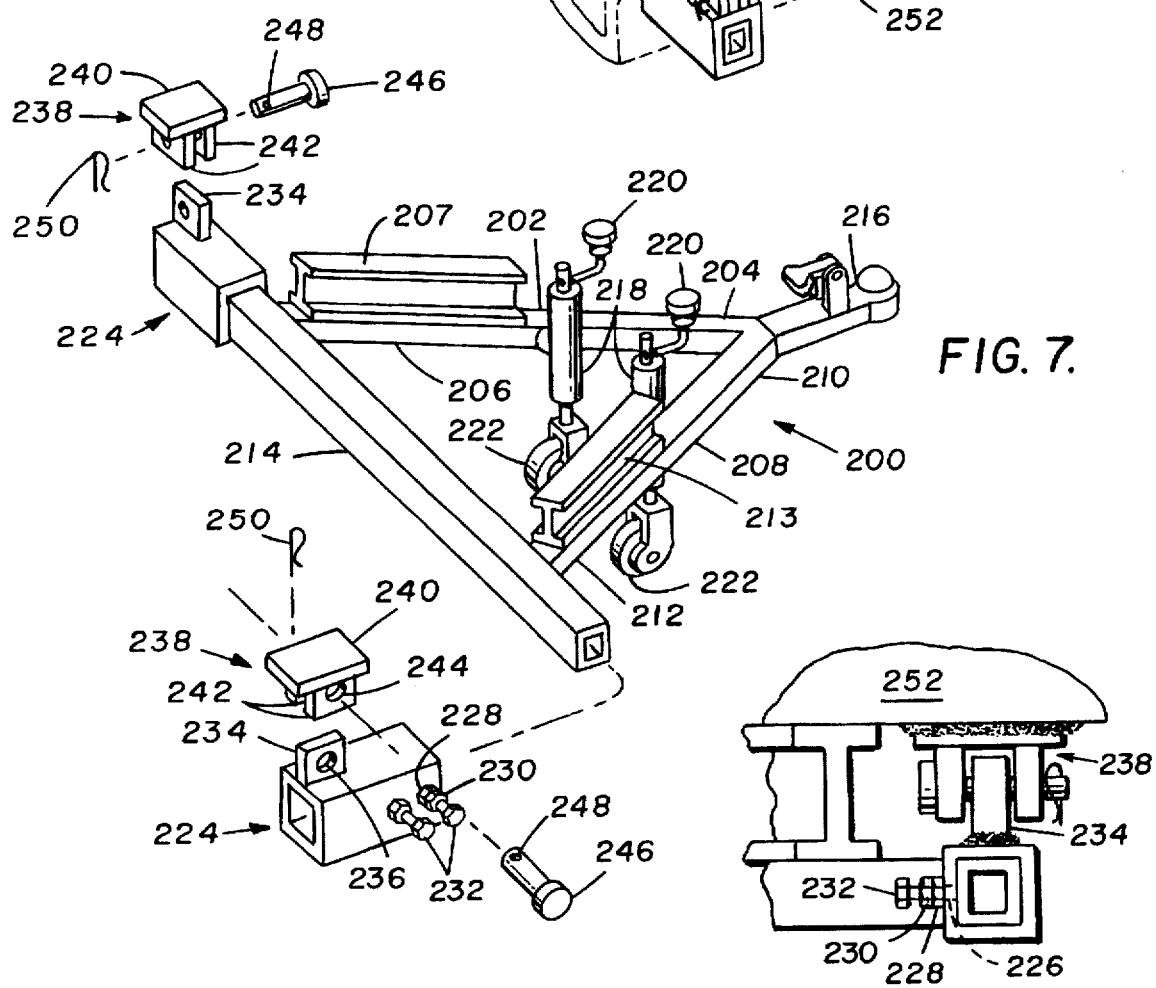
FIG. 7 is an exploded, perspective view of the portable tongue depicted in FIG. 6.
Figure 8:
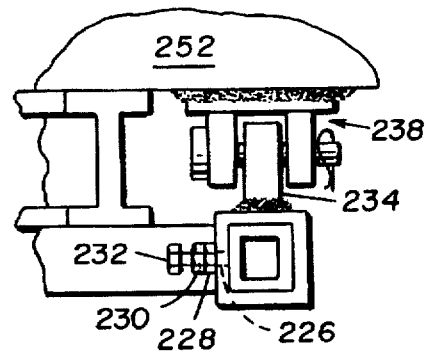
FIG. 8 is a partially broken away view of a portion of the portable tongue depicted in FIGS. 6 and 7 removably secured to a frame, such as may be used for a house trailer.

FIGS. 6, 7 and 8 illustrate, by way of example, a fourth embodiment of the portable (removable) tongue 200 removably secured to a frame 252 which supports a house trailer or the like (not shown). The frame 252 may incorporate longitudinal support members interconnected by welds or the like to one or more cross members (not shown) as is normal in conventional frames such as may be used in house trailers. The portable (removable) tongue 200 comprises a first arm 202 having a first end portion 204, a second end portion 206 and an upstanding support member, such as an I Beam, 207, a second arm 208 having a first end portion 210, a second end portion 212 and an upstanding support member, such as an I Beam, 213, a cross bar 214 secured to second end portions 206 and 212 of first and second arms 202 and 208 by any conventional means such as welds (not shown), a conventional trailer coupler and hitch lock 216 secured to first end portions 204 and 210 of first and second arms 202 and 208 by any conventional means such as welds (not shown), a pair of conventional crank jacks 218, each including a crank handle 220 and a wheel 222 pivotally secured to a respective first and second arm 202 and 208 by any conventional means such as welds (not shown), a pair of hollow coupling boots or first coupling members 224, each including a pair of openings 226 (FIG. 8) therein, a pair of first nuts 228, each having an opening (unnumbered) therein, secured to a side wall (not numbered) of first coupling member 224 by any suitable means such as welds such that the opening in each of first nuts 228 is in alignment with a respective opening 226 in each of first coupling members 224, a pair of threaded bolts 232, a second nut 230 threadedly mounted on one of the bolts 232, and a projection 234 having an opening 236 therein, each projection 234 being secured to a respective boot member 224 by welds (not numbered but shown in FIG. 8), each coupling boot member 224 being adapted for telescoping over the ends (unnumbered) of cross member 214 and being locked thereto in a selected position by the threaded bolts 232 which pass through the openings 226 in boot member 224 to engage the outer walls of the ends of cross bar 214. The portable (removable) tongue 200 further comprises a pair of second coupling members 238, each including a base plate 240 and a pair of protruding ears 242 having horizontal openings 244 therein adapted for receiving pins 246 therethrough. Each pin 246 has an opening 248 therein for receiving a cooperating fastener 250. The base plate 240 of each of the second coupling members 238 are secured to the forward end of the frame 252 by any suitable means such as welds (not numbered but shown in FIG. 8). The portable tongue 200 depicted in FIGS. 6-8 can be assembled and attached to the frame 252 of a house trailer of the like (after the base plates 240 of the second coupling members 238 have been welded to the frame 252) as shown in FIG. 8 by telescoping the first coupling or boot members 224 over a respective end of cross bar 214 until a projection 234 of first coupling member 224 is in alinement with the space between the protruding ears 242 of second coupling member 238 at which time the threaded bolts 232 are tightened to firmly engage a respective end of cross bar 214 to lock first coupling members 224 in their desired positions on cross bar 214 and the second nut 230 is tighten to assist in the locking effect; after which the respective projections 234 of first coupling member 224 are inserted between the protruding ears 242 of second coupling member 238 until the openings 236 and 244 are in alinement at which time the locking pins 246 are inserted through respective openings 244 and 236 and a fastener or cotter pin 250 is applied through the opening 248 in the lower end of each locking pin 246.

When the portable tongue 200 is assembled as previously discussed, the bottom surface of the most forward portion of frame 252 rests upon the top surfaces of upstanding support members 207 and 213 for partial support of the frame 252. The engagement of the bottom surface of frame 252 with the top surfaces of the upstanding support members 207 and 213 allows the weight of the trailer to be substantially evenly distributed across the support members 207 and 213 thus relieving excess downward forces from being exerted on pins 246 of coupling members 238.

As is readily apparent, all of the components of the portable tongue 200 except for the second coupling member 238 disclosed in the embodiment of FIGS. 6–8 can be easily separated from the frame 252 of a trailer or the like by removing each fastener or cotter pin 250 from locking pins 246, lifting each locking pin 246 from the openings 236 and 244 respectively in first coupling member 224 and second coupling member 238, thus allowing first coupling member 224 to be moved forward for separation from second coupling member 238. This separation obviates the safety hazard discussed hereinabove and allows a person to either store most components of tongue 200 or use the tongue over and over for attachment to trailers having the second coupling members 238 secured thereto for towing purposes.

Although we have shown specific construction and arrangement of the parts and features constituting preferred embodiments of our invention, changes may be made in the parts and features without affecting the operativeness of the invention. For example, it is readily apparent that the shapes of many parts or features may be square, round or otherwise than the shapes specifically set forth herein. Furthermore, it is readily apparent that other conventional fasteners such as bolts and nuts can be used to lock or secure the components. Still furthermore, it is readily apparent that, in the embodiment of FIGS. 4 and 5, other conventional means such as a threaded bolt could passing through a threaded opening 128 in each boot member 126 to either directly engage the cross bar 114 or indentations therein to lock each telescoping boot member 126 in a selective position onto the ends of cross bar 114. It will therefore be obvious to those skilled in the art that various modifications may be made without departing from the spirit of the invention. Having fully described the invention and the presently preferred embodiments thereof.

We claim:

1. A detachable hitch apparatus for releasably coupling a vehicle and a trailer frame, said hitch apparatus comprising: a coupling assembly having first and second end portions and vehicular securing means secured to said first end portion for releasably securing said coupling assembly to the vehicle; a pair of arms extending in a direction opposed to said vehicular securing means, each of said arms having a first end and a second end, said first end of each said arm being secured to said vehicular securing means; an upstanding support means secured to the upper surface of said first end of each said arm; releasable attachment means associated with each said second end of said arms for releasably securing said pair of arms to the trailer frame with said frame being supported by said upstanding support means, said releasable attachment means comprising first coupling means including a transverse support member extending outwardly from said second ends of said arms, a pair of extendible members at opposite ends of said transverse support member, each said extendible member having a first projection thereon; second coupling means for releasably secured relation with said first coupling means, said second coupling means including a second projection for engaged, secured, relation with said first projection of a respective said extendible member; means for securing said first and second projections in releasably coupled relation; and, means for securing said second coupling means to the trailer frame.

2. The detachable hitch apparatus of claim 1 wherein said first projection of each said extendible member is a first projecting ear having a first opening therein, and said second projection of each of said second coupling means is at least one ear having a second opening therein for registry responsive to assembly of said first and second coupling means.

3. The detachable hitch apparatus of claim 2 wherein said second projection of each said second coupling means is a pair of ears disposed in spaced relation for receiving a respective said first projecting ear of said extendible member therein.

4. The detachable hitch apparatus of claim 3 wherein said first and second projections are provided with openings and said means for securing said first projection and second projection is a pin disposed for insertion in said openings.

5. The detachable hitch apparatus of claim 1 including locking means for adjustably securing each of said extendible members to said transverse support member.

6. The detachable hitch apparatus of claim 5 wherein said locking means includes at least one internally threaded opening in each said extendible member and an externally threaded bolt mounted in said internally threaded opening for releasably engaging said transverse support member.

7. The detachable hitch apparatus of claim 1 wherein each said upstanding support means is an I-beam.

8. A detachable hitch apparatus for releasably coupling a vehicle and a trailer frame, said hitch apparatus comprising: a coupling assembly having first and second end portions and vehicular securing means secured to said first end portion for releasably securing said coupling assembly to the vehicle; a pair of arms extending in a direction opposed to said vehicular securing means, each of said arms having a first end and a second end, said first end of each said arm being secured to said vehicular securing means; upstanding means disposed for engaging and supporting said frame, said upstanding means being secured to the upper surface of said first end of each said arm; and releasable attachment means associated with each said second end of said arms for releasably securing said pair of arms to the frame, said releasable attachment means comprises first coupling means connected to each said second end of said arms, each said first coupling means including a projection extending therefrom, a horizontally disposed hole in each said projection, said releasable attachment means including a cross bar for supporting each said first coupling means, means for adjustably securing each of said first coupling means to said cross bar, second coupling means including a pair of spaced ears protruding therefrom and defining a gap therebetween, each of said ears having a horizontally disposed aperture therein being disposed to enter said gap defined by said ears to substantially surround said projection from said first coupling means; means for releasably securing said projections of said first coupling means to said ears of said second coupling means; and means for securing said second coupling means to the frame.

9. The detachable hitch apparatus of claim 8 wherein said means for adjustably securing each of said first coupling means to said cross bar includes a first internally threaded opening in each said first coupling means and a first externally threaded bolt mounted in said first internally threaded opening for engaging said cross bar.

10. The detachable hitch apparatus of claim 8 wherein said means for adjustably securing each of said first coupling means to said cross bar includes first and second internally threaded openings in each said first coupling means, an externally threaded bolt mounted in each of said first and second internally threaded opening, and an internally threaded nut mounted on at least one of said externally threaded bolts.

11. A detachable hitch apparatus for releasably coupling a vehicle and a trailer frame, said hitch apparatus comprising: a coupling assembly having first and second end portions and vehicular securing means secured to said first end portion for releasably securing said hitch apparatus to the vehicle; a pair of arms extending in a direction opposed to said vehicular securing means, each of said arms having a first end and a second end, said first end of each said arm being secured to said vehicular securing means; upstanding support means secured to the upper surface of said first end of each said arm, said upstanding support means being in engagement with said frame for supporting said frame; a cross bar secured to and connecting said second ends of said arms, said cross bar including end portions which extend beyond said second ends of said arms, and attachment means associated with said cross bar for releasably securing said cross bar to the frame, said releasable attachment means comprises first coupling means mounted on said end portions of said cross bar, each said first coupling means including a projection extending therefrom, a horizontally disposed hole in each said projection, means for adjustably securing each of said first coupling means to said cross bar, second coupling means including a pair of spaced ears protruding therefrom and defining a gap therebetween, each of said ears having a horizontally disposed aperture therein and being adapted to enter said gap defined by said ears to sandwich said projection from said first coupling means between said ears; means for releasably securing said projections of said first coupling means to said ears of said second coupling means; and means for securing said second coupling means to the frame.

12. The detachable hitch apparatus of claim 11 wherein said means for adjustably securing each of said first coupling means to said cross bar includes a first internally threaded opening in each said first coupling means and a first externally threaded bolt mounted in said first internally threaded opening for engaging said cross bar.

13. The detachable hitch apparatus of claim 11 wherein said means for adjustably securing each of said first coupling means to said cross bar includes first and second internally threaded openings in each said first coupling means, an externally threaded bolt mounted in each of said first and second internally threaded opening, and an internally threaded nut mounted on at least one of said externally threaded bolts.

14. The detachable hitch apparatus of claim 13 wherein each said upstanding support means is an I-beam.

* * * * *